3,157,710
PROCESS FOR THE PREPARATION OF 1,1,4,4-
TETRAALKYL-1,3-BUTADIENE
Vinton A. Hoyle, Jr., and Herman E. Davis, Kingsport,
Tenn., assignors to Eastman Kodak Company, Rochester, N.Y., a corporation of New Jersey
No Drawing. Filed Apr. 16, 1962, Ser. No. 187,913
12 Claims. (Cl. 260—681)

This invention relates to a process for the preparation of 1,1,4,4-tetraalkyl-1,3-butadienes. More particularly, this invention relates to the preparation of 1,1,4,4-tetraalkyl butadienes by the acid catalyzed cleavage and isomerization of a carboxylic acid ester having the formula:

(1) 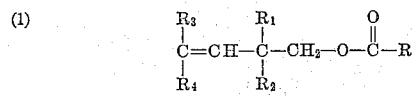

where R is an organic radical and $R_1$, $R_2$, $R_3$ and $R_4$ are the same or different lower alkyl radicals or:

(2) 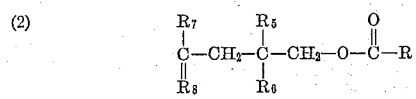

where R is an organic radical, $R_5$, $R_6$ and $R_7$ are the same or different lower alkyl radicals, and $R_8$ is a lower alkylidene radical.

The 1,1,4,4-tetraalkyl-1,3-butadienes, because of their unique properties, form a very valuable class of compounds and have a variety of uses including, for example, their use as chemical intermediates. They can be polymerized by known methods to form valuable polymers as shown, for example, by U.S. Patent 3,019,213, issued January 30, 1962. Furthermore, the hydrogenation of 1,1,4,4-tetramethyl butadiene is a convenient route to the corresponding alkene or alkane. In addition, this particular compound can be used in the synthesis of allethrin, a valuable insecticide, through its condensation with ethyl diazoacetate. It is evident, therefore, that a novel process for the preparation of 1,1,4,4-tetraalkyl-1,3-butadienes will substantially enhance the art.

Accordingly, it is an object of this invention to provide a novel process for the preparation of 1,1,4,4-tetraalkyl-1,3-butadienes.

Another object of this invention is to provide a simple, direct and economically feasible process for the preparation of 1,1,4,4-tetraalkyl-1,3-butadienes.

Still another object of this invention is to provide an acid catalyzed cleavage and isomerization process for preparing 1,1,4,4-tetraalkyl-1,3-butadienes from the aforementioned carboxylic acid esters.

Other objects and advantages of the present invention will become apparent from an examination of the following specification and claims.

In accordance with the present invention it has been found that 1,1,4,4-tetraalkyl-1,3-butadienes can be readily prepared by contacting an acid catalyst, at a temperature in the range of about 125° to about 250° C., with a carboxylic acid ester having the formula:

(1) 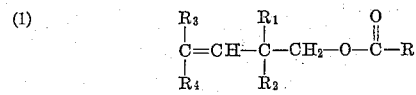

where R is an organic radical and $R_1$, $R_2$, $R_3$ and $R_4$ are the same or different lower alkyl radicals or:

(2) 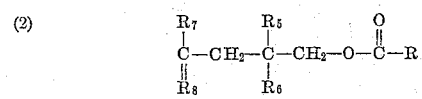

where R is an organic radical, $R_5$, $R_6$ and $R_7$ are the same or different lower alkyl radicals and $R_8$ is a lower alkylidene radical. The reaction, illustrated with an ester having Formula 1 above, appears to proceed according to the following equation, although it should be clearly understood that the invention is not limited to any particular mechanism.

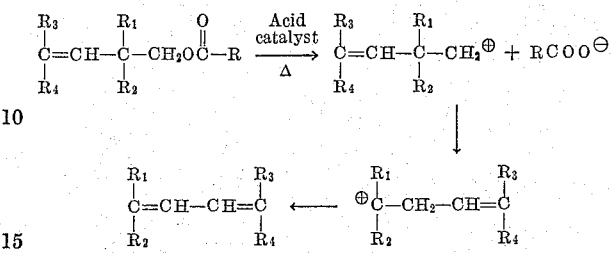

A significant feature of this invention is that, under the conditions employed, by-products, for example, 2,2,4,4-tetramethyltetrahydrofuran which is formed during the reaction using 2,2,4-trimethyl-3-pentenyl esters, represent only a minor portion of the reaction product. Thus, there is provided a simple, direct and economically feasible process for the preparation of 1,1,4,4-tetraalkyl-1,3-butadienes such as 1,1,4,4-tetramethyl-1,3-butadiene.

Another significant feature of this invention is that carboxylic acid esters in which $R_1$ and $R_2$ are hydrogen will not form the corresponding substituted 1,3 butadienes according to the process of this invention. It was completely unexpected, therefore, that the higher homologs, e.g., where $R_1$ and $R_2$ are methyl, would form the 1,1,4,4-tetraalkyl-1,3-butadienes in good yields according to the process of this invention.

In practicing this invention it has been found that the aforementioned carboxylic acid esters, under the conditions set forth herein, will react in the presence of said catalysts to form 1,1,4,4-tetraalkyl-1,3-butadiene in good yields. These esters can be prepared by any methods known to those skilled in the art to be effective for this purpose. For example, they can be prepared in good yields by thermally cracking the diesters of the appropriate 1,3 diol. Using this procedure, the carboxylic acid esters having ethylenic unsaturation in the 3 or 4 position are obtained in isomeric mixtures from which each of the esters can be separated using techniques known to be useful for this purpose. U.S. Patent 2,941,011, issued June 14, 1960, discloses the preparation of 2,2,4-trimethyl-3-pentenyl esters utilizing the aforementioned technique. The higher molecular weight esters can be prepared using similar conditions, as is obvious to those skilled in the art.

Numerous mono and polycarboxylic acids which can be employed to form the carboxylic acid esters employed in this invention are known in the prior art. Thus, any of the aromatic, aliphatic or alicyclic carboxylic acids can be employed. Accordingly, R in the above formulas, although preferably an aryl, alkyl or cycloalkyl radical, desirably containing up to about 20 carbon atoms, can be any organic radical. Generally, however, the organic radicals containing only carbon, hydrogen and oxygen have been found to be the most satisfactory. Suitable acids for the said purpose, therefore, include acetic acid, propionic acid, butyric acid, isobutyric acid, valeric acid, caproic acid, oxalic acid, adipic acid, succinic acid, benzoic acid, phthalic acid, terephthalic acid, cylohexane carboxylic acid and the like. The preferred acids are the lower molecular weight aliphatic monocarboxylic acids, for example, those in which the acyl radicals in the above formulas contain 1–8 carbon atoms. The acids employed to form the carboxylic acid esters employed in the practice of this invention can contain one or more substituents or groups. However, as will be obvious to those skilled in the art, specific substituents or groups should be such that they do not substantially affect the process in an adverse manner when the carboxylic acid esters are employed in practicing this invention. As previously indicated, $R_1$, $R_2$, $R_3$, $R_4$, $R_5$, $R_6$ and $R_7$ in the above formulas can be the same or different lower alkyl radicals. These lower alkyl radicals desirably contain 1–4 carbon atoms. Suitable lower alkyl radicals include, for example, methyl, ethyl, propyl, butyl, isobutyl and the like. In contrast, $R_8$ is a lower alkylidene radical, as exemplified by methylene, ethylidene, propylidene, isobutylidene and the like.

The acid catalysts employed in the practice of this invention form a well known class of catalysts including, for example, organic and inorganic acids and salts of these acids with weak bases. These acid catalysts are employed in effective catalytic amounts and are generally characterized by a pH of 3 or lower when dispersed in water in a concentration of 1%, by weight. The organic acids are exemplified by aromatic and aliphatic sulfonic of phosphonic acids, for example, benzene, toluene or naphthalene sulfonic and phosphonic acids or low molecular weight alkane mono and disulfonic acids. Organic acids and their salts are preferably employed in the practice of this invention. However, inorganic acids will give good results and such acids are exemplified by sulfuric, phosphoric or hydrochloric acids as well as salts of these acids with weak bases. It is also possible to employ the Lewis acids, for example, boron trifluoride, aluminum trichloride, zinc chloride, and the like, in the practice of this invention.

Reaction temperatures in the range of about 125° C. to about 250° C. are generally employed in the practice of this invention. The preferred temperatures are generally those in the range of about 140 to about 160° C., although under some circumstances, lower or higher temperatures may be preferred. Under these reaction conditions, the catalyst concentration is subject to wide variation. However, catalyst concentrations in the range of about .1 to about 10%, and preferably about 1 to about 5%, by weight, based on the ester, give good results. The higher temperatures and catalyst concentrations will generally result in shorter reaction times while lower temperatures and lower catalyst concentrations generally result in longer reaction times. The reaction will generally be complete in periods of not more than 7 hours, although, under some conditions, longer reaction times can be employed. The reaction product can be removed by any of the conventional means known in the prior art for this purpose. A particularly effective method is to distill out the substituted diene as it forms.

The reaction is not particularly dependent on any specific pressure conditions and, therefore, atmospheric, elevated or reduced pressures can be employed. The pressure employed, if any, is usually only sufficient to maintain the reaction mixture in liquid form when a diluent is employed. Where a diluent is employed, it can be an aliphatic alkane or cycloalkane such as pentane, hexane, heptane or cycloheptane, a hydrogenated aromatic compound such as tetralin or decalin, a higher molecular weight liquid paraffin or mixture of paraffins which are liquid at the reaction temperatures, or an aromatic hydrocarbon such as benzene, toluene, xylene or the like. The nature of the diluent is subject to considerable variation, although it should be liquid under the conditions of reaction and relatively inert. Other diluents which can be used include any of the well known inert liquid hydrocarbons such as octane, isooctane and the like.

This invention can be further illustrated by the following examples of preferred embodiments thereof although it will be understood that these examples are included merely for purposes of illustration and are not intended to limit the scope of the invention unless otherwise specifically indicated.

*Example 1*

As already indicated, carboxylic acid esters having the above formulas will undergo cleavage and isomerization at temperatures in the range of about 125° to about 250° C. in the presence of acid catalysts, to form the 1,1,4,4-tetraalkyl-1,3-butadiene. To illustrate, a mixture of 594 g. (3 moles) of 2,2,4-trimethyl-3-pentenyl isobutyrate to 20 g. of p-toluenesulfonic acid is added to a distillation flask equipped with a 6″ Vigreux column and distillation head. The mixture is heated at 160° C. and after 15 min. distillate begins to appear in the head. The distillation is continued until the head temperature raises to 140° C. The distillate (458 g.) is washed with 5% sodium hydroxide solution, water and dried over magnesium sulfate. The organic material obtained is distilled to give 260 g. of 1,1,4,4-tetramethyl-1,3-butadiene, boiling point 134° C., $n_D^{20} = 14,760$.

*Example 2*

A mixture of 170 g. (1 mole) of 2,2,4-trimethyl-3-pentenyl acetate and 2 g. of methane-disulfonic acid is placed in a 600 cc. autoclave and heated for 2 hours at 200° C. under 500 p.s.i. of nitrogen. Using the separation procedure of Example 1 there is obtained 93 g. of 1,1,4,4-tetramethyl-1,3-butadiene.

*Example 3*

In practicing the invention, it is preferred to use carboxylic acid esters in which the alcohol moiety is ethylenically unsaturated in the 3 position. However, as already pointed out, carboxylic acid esters in which the alcohol moiety is ethylenically unsaturated in the 4 position can be employed in practicing this invention with good results. To illustrate, a mixture of 594 g. (3 moles) of 2,2,4-trimethyl-4-pentenyl isobutyrate and 20 g. of p-toluene sulfonic acid are heated at 180° C. and 500 p.s.i. nitrogen pressure for 6 hr. using the procedure of Example 2. A 70% yield of 1,1,4,4-tetramethyl-1,3-butadiene is obtained.

*Example 4*

The alkyl substituents in the alcohol moiety of the carboxylic acid esters employed in the practice of this invention can be the same or different lower alkyl radicals. Thus, a mixture of 266 g. (1 mole) of 2,4-diethyl-2-butyl-4-octenyl-2-ethylhexanoate and 5 g. of sulfuric acid is heated for 4 hr. at 200° C. using the procedure of Example 2. A 85% yield of 1,4-diethyl-1,4-dibutyl-1,3-butadiene is obtained.

*Example 5*

A mixture of 266 g. (1 mole) of 2,2-dimethyl-4-ethyl-3-octenyl acetate and 2.5 g. boron trifluoride dietherate is heated for 7 hr. at 180° C. using the procedure of Example 2. An 80% yield of 1,1-dimethyl-4-ethyl-4-butyl-1,3-butadine is obtained.

Although the invention has been described in considerable detail with reference to certain preferred embodiments thereof, it will be understood that variations and modifications can be effected without departing from the spirit and scope of the invention as described hereinabove and as defined in the appended claims.

We claim:

1. The method which comprises contacting an acid catalyst at a temperature in the range of about 125° to about 250° C., with a carboxylic acid ester having a formula selected from the group consisting of:

(1) 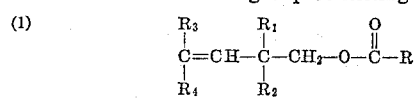

where R is an organic radical and $R_1$, $R_2$, $R_3$ and $R_4$ are each lower alkyl radicals, and (2) 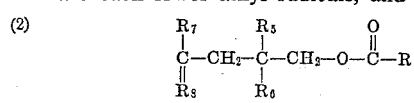

where R is an organic radicals, $R_5$, $R_6$ and $R_7$ are each lower alkyl radicals and $R_8$ is a lower alkylidene radical.

2. The method which comprises contacting an acid catalyst, at a temperature in the range of about 125° to about 250° C., with a carboxylic acid ester having the formula:

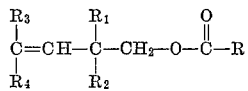

where R is an organic radical and $R_1$, $R_2$, $R_3$ and $R_4$ are each lower alkyl radicals.

3. The method which comprises contacting an acid catalyst, at a temperature in the range of about 125° to about 250° C., with a carboxylic acid ester having the formula:

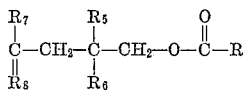

where R is an organic radical, $R_5$, $R_6$ and $R_7$ are each lower alkyl radicals and $R_8$ is a lower alkylidene radical.

4. The method which comprises contacting an acid catalyst having a pH of no more than 3 when dispersed in water in a concentration of 1%, by weight, at a temperature in the range of about 125° to about 250° C., with a carboxylic acid ester having a formula selected from the group consisting of:

(1)
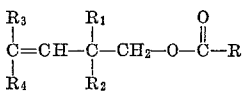

where R is an organic radical and $R_1$, $R_2$, $R_3$ and $R_4$ are each lower alkyl radicals and (2)
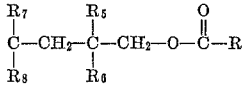

where R is an alkyl radical, $R_5$, $R_6$ and $R_7$ are each lower alkyl radicals and $R_8$ is a lower alkylidene radical.

5. The method which comprises contacting an acid catalyst having a pH of no more than 3 when dispersed in water in a concentration of 1%, by weight, at a temperature in the range of about 125° to about 250° C., with a carboxylic acid ester having a formula selected from a group consisting of:

(1)
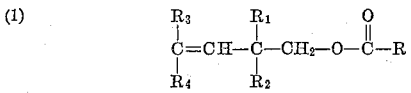

where R, $R_1$, $R_2$, $R_3$ and $R_4$ are each lower alkyl radicals and (2)
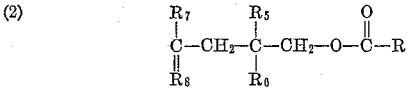

where R, $R_5$, $R_6$ and $R_7$ are each lower alkyl radicals and $R_8$ is a lower alkylidene radical.

6. The methd according to claim 5 in which the acid catalyst is an aromatic sulfonic acid.

7. The method according to claim 5 in which the acid catalyst is an aliphatic sulfonic acid.

8. The method which comprises contacting p-toluene sulfonic acid, at a temperature of about 200° C., with 2,24-trimethyl-3-pentenyl ester of isobutyric acid.

9. The method which comprises contacting methane sulfonic acid, at a temperature of about 200° C., with 2,2,4-trimethyl-3-pentenyl ester of acetic acid.

10. The method which comprises contacting p-toluene sulfonic acid, at a temperature of about 180° C. and a pressure of about 500 p.s.i., with 2,2,4-trimethyl-4-pentenyl ester of isobutyric acid.

11. The method which comprises contacting sulfonic acid at a temperature of about 200° C., with 2,4-diethyl-2-butyl-4-octenyl ester of 2-ethylhexanoic acid.

12. The method which comprises contacting boron trifluoride dietherate, at a temperature of about 180° C., with 2,2-dimethyl-4-ethyl-3-octenyl ester of acetic acid.

References Cited in the file of this patent
UNITED STATES PATENTS 2,375,086    Davis _____ May 1, 1945
2,502,430    Copenhaver et al. _____ Apr. 4, 1950

OTHER REFERENCES

Roberts et al.: The Mechanism of the Acid Catalyzed Ester Hydrolysis, Esterification, and Oxygen Exchange of Carboxylic Acid, J. Am. Chem. Soc., vol. 61, pages 2584–7 (1939).